(12) United States Patent
Dowski, Jr.

(10) Patent No.: US 6,842,297 B2
(45) Date of Patent: Jan. 11, 2005

(54) WAVEFRONT CODING OPTICS

(75) Inventor: Edward Raymond Dowski, Jr., Lafayette, CO (US)

(73) Assignee: CDM Optics, Inc., Boulder, CO (US)

( * ) Notice: Subject to any disclaimer, the term of this patent is extended or adjusted under 35 U.S.C. 154(b) by 468 days.

(21) Appl. No.: 09/942,392

(22) Filed: Aug. 31, 2001

(65) Prior Publication Data

US 2003/0063384 A1 Apr. 3, 2003

(51) Int. Cl.[7] .................. G02B 13/00; G02B 27/42; G02F 1/01; G06K 9/64; H01J 3/14; G01M 11/00
(52) U.S. Cl. .................. 359/724; 359/558; 359/279; 382/279; 250/216; 356/124.5
(58) Field of Search .................. 359/724, 558, 359/738, 279, 737; 382/254, 275, 232, 279, 312; 250/216, 201.2, 201.9, 208.1; 356/124.5

(56) References Cited

U.S. PATENT DOCUMENTS

| | | |
|---|---|---|
| 2,959,105 A | 11/1960 | Sayanagi |
| 3,054,898 A | 9/1962 | Westover et al. |
| 3,305,294 A | 2/1967 | Alvarez |
| 3,583,790 A | 6/1971 | Baker |
| 3,614,310 A | 10/1971 | Korpel |
| 3,856,400 A | 12/1974 | Hartmann et al. |
| 3,873,058 A | 3/1975 | Whitehouse |
| 4,062,619 A | 12/1977 | Hoffman |
| 4,082,431 A | 4/1978 | Ward, III |
| 4,174,885 A | 11/1979 | Joseph et al. |
| 4,178,090 A | 12/1979 | Marks et al. |
| 4,255,014 A | 3/1981 | Ellis |
| 4,275,454 A | 6/1981 | Klooster, Jr. |
| 4,276,620 A | 6/1981 | Kahn et al. |
| 4,308,521 A | 12/1981 | Casasent et al. |
| 4,349,277 A | 9/1982 | Mundy et al. |
| 4,466,067 A | 8/1984 | Fontana |
| 4,480,896 A | 11/1984 | Kubo et al. |
| 4,573,191 A | 2/1986 | Kidode et al. |
| 4,575,193 A | 3/1986 | Greivenkamp, Jr. |

(List continued on next page.)

FOREIGN PATENT DOCUMENTS

| | | |
|---|---|---|
| EP | 0531928 B1 | 3/1993 |
| EP | 0584769 | 3/1994 |
| EP | 0618473 A2 | 10/1994 |
| EP | 0742456 S | 11/1996 |
| EP | 0759573 A2 | 2/1997 |
| EP | 0791848 A2 | 8/1997 |
| EP | 0981245 A2 | 2/2000 |
| GB | 2278750 A | 12/1994 |
| JP | 2000-98301 A | 4/2000 |
| WO | WO 99/57599 | 11/1999 |
| WO | WO 00/52516 | 9/2000 |

OTHER PUBLICATIONS

J. Ojeda–Castaneda, L. R. Berriel–Valdos, and E. Montes, "Spatial filter for increasing the depth of focus", Optics Letters, vol. 10, No. 11, p520–522, Nov., 1985.

(List continued on next page.)

Primary Examiner—Georgia Epps
Assistant Examiner—Jack Dinh
(74) Attorney, Agent, or Firm—Lathrop & Gage, L.C.

(57) ABSTRACT

Improved Wavefront Coding Optics, which apply a phase profile to the wavefront of light from an object to be imaged, retain their insensitivity to focus related aberration, while increasing the heights of the resulting MTFs and reducing the noise in the final images. Such improved Wavefront Coding Optics have the characteristic that the central portion of the applied phase profile is essentially flat (or constant), while a peripheral region of the phase profile around the central region alternately has positive and negative phase regions relative to the central region.

21 Claims, 11 Drawing Sheets

U.S. PATENT DOCUMENTS

| | | |
|---|---|---|
| 4,580,882 A | 4/1986 | Nuchman et al. |
| 4,589,770 A | 5/1986 | Jones et al. |
| 4,642,112 A | 2/1987 | Freeman |
| 4,650,292 A | 3/1987 | Baker et al. |
| 4,655,565 A | 4/1987 | Freeman |
| 4,725,881 A | 2/1988 | Buchwald |
| 4,734,702 A | 3/1988 | Kaplan |
| 4,794,550 A | 12/1988 | Greivenkamp, Jr. |
| 4,804,249 A | 2/1989 | Reynolds et al. |
| 4,825,263 A | 4/1989 | Desjardins et al. |
| 4,827,125 A | 5/1989 | Goldstein |
| 4,843,631 A | 6/1989 | Steinpichler et al. |
| 4,936,661 A | 6/1990 | Betensky et al. |
| 4,964,707 A | 10/1990 | Hayashi |
| 4,989,959 A | 2/1991 | Plummer |
| 5,003,166 A | 3/1991 | Girod |
| 5,076,687 A | 12/1991 | Adelson |
| 5,102,223 A | 4/1992 | Uesugi et al. |
| 5,128,874 A | 7/1992 | Bhanu et al. |
| 5,142,413 A | 8/1992 | Kelly |
| 5,165,063 A | 11/1992 | Strater et al. |
| 5,166,818 A | 11/1992 | Chase et al. |
| 5,193,124 A | 3/1993 | Subbarao |
| 5,218,471 A | 6/1993 | Swanson et al. |
| 5,243,351 A | 9/1993 | Rafanelli et al. |
| 5,248,876 A | 9/1993 | Kerstens et al. |
| 5,270,825 A | 12/1993 | Takasugi et al. |
| 5,270,861 A | 12/1993 | Estelle |
| 5,270,867 A | 12/1993 | Estelle |
| 5,280,388 A | 1/1994 | Okayama et al. |
| 5,299,275 A | 3/1994 | Jackson et al. |
| 5,301,241 A | 4/1994 | Kirk |
| 5,307,175 A | 4/1994 | Seachman |
| 5,317,394 A | 5/1994 | Hale et al. |
| 5,337,181 A | 8/1994 | Kelly |
| 5,426,521 A | 6/1995 | Chen et al. |
| 5,438,366 A | 8/1995 | Jackson et al. |
| 5,442,394 A | 8/1995 | Lee |
| 5,444,574 A | 8/1995 | Ono et al. |
| 5,465,147 A | 11/1995 | Swanson |
| 5,473,473 A | 12/1995 | Estelle et al. |
| 5,476,515 A | 12/1995 | Kelman et al. |
| 5,521,695 A | 5/1996 | Cathey, Jr. et al. |
| 5,532,742 A | 7/1996 | Kusaka et al. |
| 5,555,129 A | 9/1996 | Konno et al. |
| 5,565,668 A | 10/1996 | Reddersen et al. |
| 5,568,197 A | 10/1996 | Hamano |
| 5,572,359 A | 11/1996 | Otaki et al. |
| 5,610,684 A | 3/1997 | Shiraishi |
| 5,640,206 A | 6/1997 | Kinoshita et al. |
| 5,706,139 A | 1/1998 | Kelly |
| 5,748,371 A * | 5/1998 | Cathey et al. ............ 359/558 |
| 5,751,475 A | 5/1998 | Ishiwata et al. |
| 5,756,981 A | 5/1998 | Roustaei et al. |
| 5,969,853 A | 10/1999 | Takaoka |
| 5,969,855 A | 10/1999 | Ishiwata et al. |
| 6,021,005 A * | 2/2000 | Cathey et al. ............ 359/737 |
| 6,025,873 A | 2/2000 | Nishioka et al. |
| 6,034,814 A | 3/2000 | Otaki |
| 6,037,579 A | 3/2000 | Chan et al. |
| 6,069,738 A * | 5/2000 | Cathey et al. ............ 359/558 |
| 6,091,548 A | 7/2000 | Chen |
| 6,097,856 A * | 8/2000 | Hammond, Jr. ............ 382/312 |
| 6,121,603 A | 9/2000 | Hang et al. |
| 6,128,127 A | 10/2000 | Kusaka |
| 6,144,493 A | 11/2000 | Okuyama et al. |
| 6,172,723 B1 | 1/2001 | Inoue et al. |
| 6,172,799 B1 | 1/2001 | Raj |
| 6,208,451 B1 | 3/2001 | Itoh |
| 6,218,679 B1 | 4/2001 | Takahara et al. |
| 6,219,113 B1 | 4/2001 | Takahara |
| 6,248,988 B1 | 6/2001 | Krantz |
| 6,525,302 B2 * | 2/2003 | Dowski et al. ............ 250/201.2 |
| 2002/0195548 A1 * | 12/2002 | Dowski et al. ............ 250/216 |
| 2002/0196980 A1 * | 12/2002 | Dowski ............ 382/232 |
| 2003/0169944 A1 * | 9/2003 | Dowski et al. ............ 382/279 |

OTHER PUBLICATIONS

J. Ojeda–Castaneda, and A. Diaz, "High focal depth by quasibifocus", vol. 27, No. 20, p4163–4165, Oct. 15, 1988.

W. Chi and N. George, "Electronic imaging using a logarithmic asphere", Optics Letters, vol. 28, No. 12, p 875–877, Jun. 15, 2001.

J. Ojeda–Castaneda, E. Tepichin, and A. Pons, "Apodization of annular apertures: Strehl ratio", Applied Optics, vol. 27, No. 24, p 5140–5145, Dec. 15, 1988.

D. L. Marks, R. A. Stack, D. J. Brady, and J. Van der Gracht, "Three–dimensional tomography using a cubic–phase plate extended depth–of–field system", Optics Letters, vol. 24, No. 4, p 253–255, Feb. 15, 1999.

S. C. Tucker, W. T. Cathey, and E. R. Dowski, Jr, "Extended depth of field and aberration control for inexpensive digital microscope systems", Optics Express, vol. 4, No. 11, p467–474, May 24, 1999.

H. Bartelt, J. Ojeda–Castaneda, and E. E. Sicre, "Misfocus tolerance seen by simple inspection of the ambiguity function", Applied Optics, vol. 23, No. 16, p. 2693–2696, Aug. 15, 1984.

J. Ojeda–Castaneda, L. R. Berriel–Valdos, and E. Montes, "Ambiguity function as a design tool for high focal depth", Applied Optics, vol. 27, No. 4, p 790–795, Feb. 15, 1988.

J. Ojeda–Castaneda, P. Andres, and A. Diaz, "Annular apodizers for low sensitivity to defocus and to spherical aberration", Optics Letters, vol. 11, No. 8, p 487–489, Aug., 1986.

J. Ojeda–Castaneda, E. Tepichin, and A. Diaz, "Arbitrarily high focal depth with a quasioptimum real and positive transmittance apodizer", Applied Optics, vol. 28, No. 13, p 2866–2870, Jul. 1, 1989.

J. Ojeda–Castaneda, and L. R. Berriel–Valdos, "Arbitrarily high focal depth with finite apertures", Optics Letters, vol. 13, No. 3, p 183–185, Mar., 1988.

G. Indebetouw, and H. Bai, "Imaging with Fresnel zone pupil masks: extended depth of field", Applied Optics, vol. 23, No. 23, p 4299–4302, Dec. 1, 1984.

W. T. Welford, "Use of annular apertures to increase focal depth", Journal of the Optical Society of America, vol. 50, No. 8, p 749–753, Aug., 1960.

C. Varamit, and G. Indebetouw, "Imaging properties of defocused partitioned pupils", J. Opt. Soc. Am. A, vol. 2, No. 6, p 799–802, Jun. 1985.

E. R. Dowski Jr., and W. T. Cathey, "Single lens single–image incoherent passive–ranging systems", Applied Optics, vol. 33, No. 29, p 6762–6773, Oct. 10, 1994.

W. T. Cathey, B. R. Frieden, W.T. Rhodes, and C. K. Rushforth, "Image gathering and processing for enhanced resolution", J. Opt. Soc. Am. A, vol. 1, No. 3, p 241–250, Mar. 1984.

J. Van der Gracht, E. R., Dowski Jr., M. G. Taylor, and D. M. Deaver, "Broadband behavior of an optical–digital focus–invariant system", Optics Letters, vol. 21, No. 13, p 919–921, Jul. 1, 1996.

G. Hausler, "A method to increase the depth of focus by two step image processing", Optical Communications, vol. 6, No. 1, p. 38–42, Sep., 1972.

C. J Cogswell, N. I. Smith, K. G. Larkin, and P. Hariharan, "Quantitative DIC microscopy using a geometric phase shifter", SPIE, vol. 2984, p72–81, 1997.

D. Kermisch, "Partially coherent image processing by laser scanning", Journal of the Optical Society of America, vol. 65, No. 8, p 887–891, Aug., 1975.

R. J. Pieper and A. Korpel, "Image processing for enhanced depth of field", Applied Optics, vol. 22, No. 10, p 1449–1453, May 5, 1983.

G. E. Johnson, E. R. Dowski, Jr. and W. T. Cathey, "Passive ranging through wave–front coding: information and application", Applied Optics, vol. 39, No. 11, p 1700–1710, Apr. 10, 2000.

G. Y. Sirat, "Conoscopic holography. I. Basic principles and physical basis", J. Opt. Soc. Am. A, vol. 9, No. 1, p 70–90, Jan. 1992.

E. R. Dowski, Jr, and W. T. Cathey, "Extended depth of field through wave–front coding", Applied Optics, vol. 34, No. 11, p 1859–1866, Apr. 10, 1995.

H. B. Wach, E. R. Dowski,Jr., and W. T. Cathey, "Control of chromatic focal shift through wave–front coding", Applied Optics, vol. 37, No. 23, p 5359–5367, Aug. 10, 1998.

D. Kermisch, "Principle of equivalence between scanning and conventional optical imaging systems", J. Opt. Soc. Am, vol. 67, No. 10, p 1357–1360, Oct., 1977.

J. Ojeda–Castaneda., R. Ramos and A. Noyola–Isgleas, "High focal depth by apodization and digital restoration", Applied Optics, vol. 27, No. 12, p 2583–2588, Jun. 15, 1988.

J. Ojeda–Castaneda., and L. R. Berriel–Valdos, "Zone plate for arbitrarily high focal depth", Applied Optics, vol. 29, No. 7, p 994–997, Mar. 1, 1990.

J.T. McCrickerd, "Coherent processing and depth of focus of annular aperture imagery", Applied Optics, vol. 10, No. 10, p2226–2230, Oct., 1971.

M. Mino and Y. Okano, "Improvement in the OTF of a defocused optical system through the use of shade apertures", Applied Optics, vol. 10, No. 10, p2219–2225, Oct., 1971.

S. Kubo, M. Inui, and Y. Miyake, "Preferred sharpness of photographic color images", Journal of Imaging Science, vol. 29, No. 6, p213–215, Nov./Dec. 1985.

C. J. Cogswell and C. J. R. Sheppard, "Confocal differential interference contrast (DIC) microscopy: including a theoretical analysis of conventional and confocal DIC imaging", Journal of Microscopy, vol. 165, part 1, p 81–101, Jan., 1992.

J.M. Schmitt, S. L. Lee and K. M. Yung, "An optical coherence microscope with enhanced resolving power in thick tissue", Optics Communications, vol. 142, p 203–207, Oct. 15, 1997.

K. J. Barnard, E. A. Watson and P.F. McManamon, "Nonmechanical microscanning using optical space–fed phased arrays", Optical Engineering, vol. 33, No. 9, p 3063–3071, Sep., 1994.

W. T. Cathey and W. C. Davis, "Imaging system with range to each pixel", J Opt. Soc. Am A, vol. 3, No. 9, p1537–1542, Sep., 1986.

J.E. Greivenkamp, "Color dependent optical prefilter for the suppression of aliasing artifacts", Applied Optics, vol. 29, No. 5, p 676–684, Feb. 10, 1990.

J. T. McCrickerd, "Coherent processing and depth of focus of annular aperture imagery", Applied Optics, vol. 10, No. 10, p 2226–2230, Oct., 1971.

M. Kawakita, K. Iizuka, T. Aida, H. Kikuchi, H. Fujikake, J. Yonai and K. Takizawa, "Axi–version camera: a three–dimension camera", In Three–dimensional Image Capture and Applications III, Brian D. Comer, Joseph H. Nurre, Editors, Proceedings of SPIE, vol. 3958, p 61–70, 2000.

C. Wust and D. W. Capson, "Surface profile measurement using color fringe projection", Machine Vision and Applications, vol. 4, p 193–203, 1991.

S. V. Shatalin, J. B. Tan, R. Juskaitis and T. Wilson, "Polarization contrast imaging of thin films in scanning microscopy", Optics Communications, vol. 118, p 291–299, May 1, 1995.

T. Fukano, "Geometrical cross–sectional imaging by a heterodyne wavelength–scanning interference confocal microscope", Optics Letters, vol. 25, No. 8, p 548–550, Apr. 15, 2000.

Q–S. Chen and M. S. Weinhous, "Sub–pixel shift with fourier transformation to achieve efficient and high quality image interpolation", SPIE, vol. 2, No. 3661, p 728–736, Feb. 1999.

H. Wei, and T. D. Binnie, "High–resolution image reconstruction for multiple low–resolution images", 7th International Conference on Image Processing and its Applications, Pub. #465, vol. 2 p596–600 (1999).

G. Hausler, and E. Korner, "Imaging with expanded depth of focus", Zeiss Inform, Oberkochen, 29, No. 98E, p 9–13 (1986–1987).

Hecht, Eugene, *Optics,* Second Edition, 1987, pp. 171–181.

Veldkamp, Wilfrid B., and McHugh, Thomas J., "Binary Optics", Scientific American, May 1, 1992, vol. 266, No. 5, pp. 50–55.

O'Shea, Donald C. and Harrigan, Michael E., "Chapter 33, Aberration Curves in Lens Design", Handbook of Optics, vol. 1, 1995, pp. 33.1–33.5, McGraw–Hill, New York.

Abstract of JP 60247611 A, published Jul. 12, 1985 (Toshiba KK), Patent Abstracts of Japan, May 6, 1986, vol. 010, No. 119 (p–435), 1 page.

Poon, Ting–Chung and Motamedi, Masoud, "Optical/digital incoherent image processing for extended depth of field", Applied Optics vol. 26, No. 21, Nov. 1987, pp. 4612–4615.

Bradburn, Sarah, Cathey, Wade Thomas and Dowski, Edward R., Jr., "Realizations of focus invariance in optical–digital systems with wave–front coding", Applied Optics vol. 38, No. 35, Dec. 10, 1997, pp. 9157–9166.

Van der Gracht, Joseph, Dowski, Edward R., Jr., Cathey, W. Thomas and Bowen, John P., "Aspheric optical elements for extended depth of field imaging", SPIE vol. 2537, pp. 279–288, 1995.

Siebert, J. (Officer), International Search Report received in PCT/US01/26126, international filing date Aug, 2, 2001, report completed Jun. 24, 2003, 3 pages.

* cited by examiner

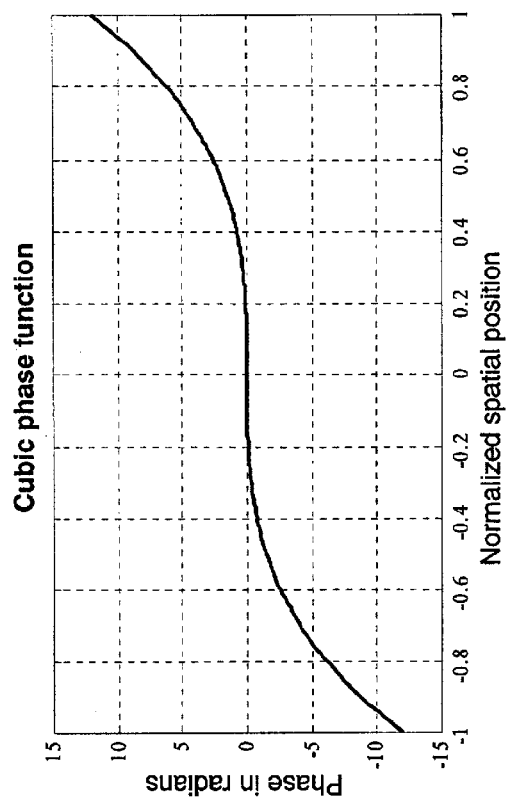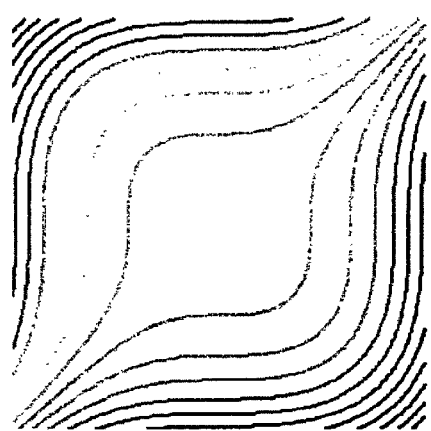
Figure 2 (Prior Art)

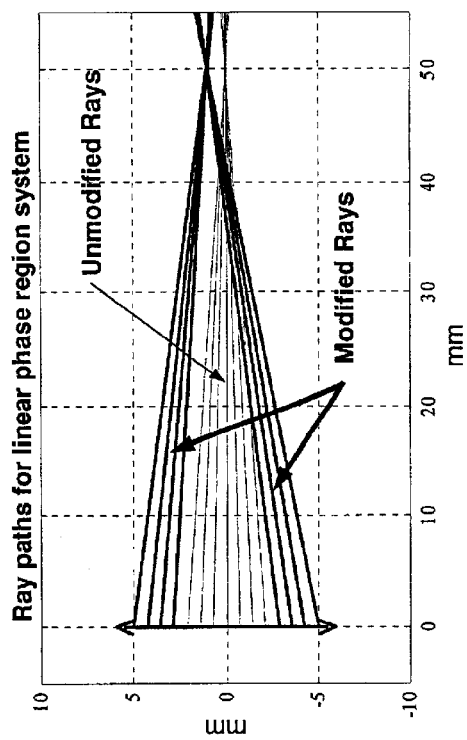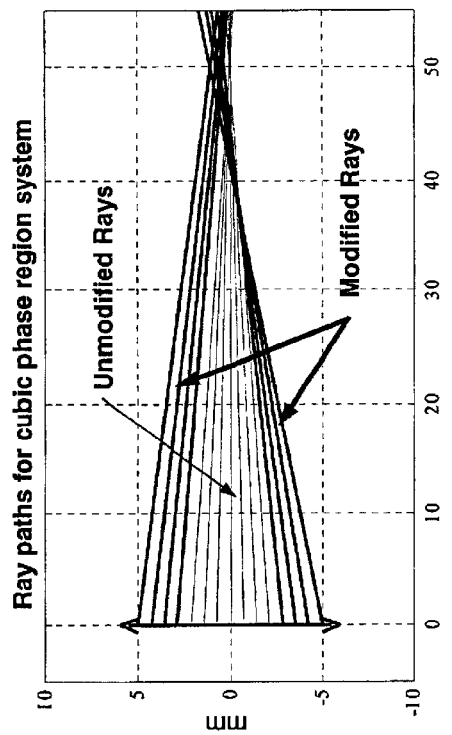

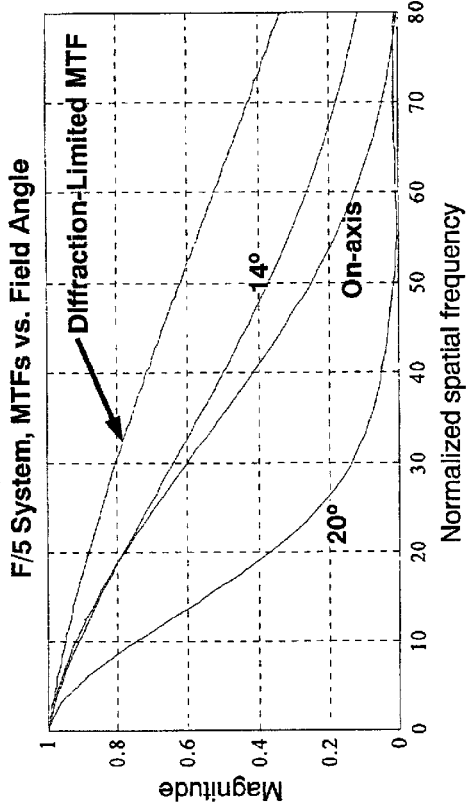
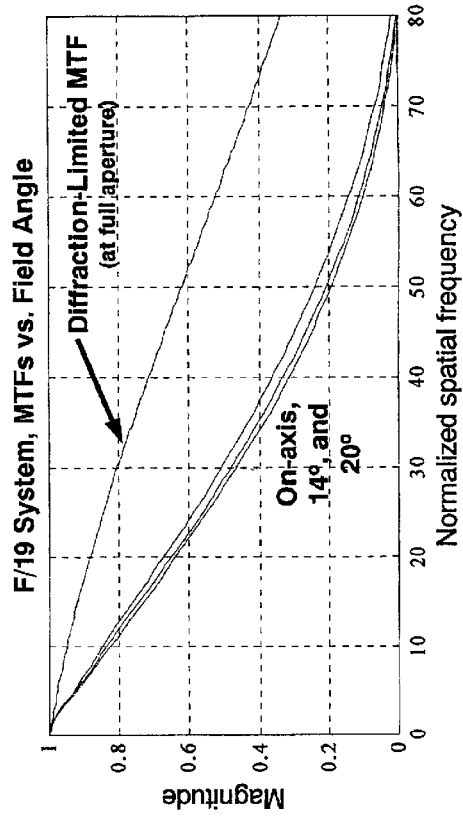
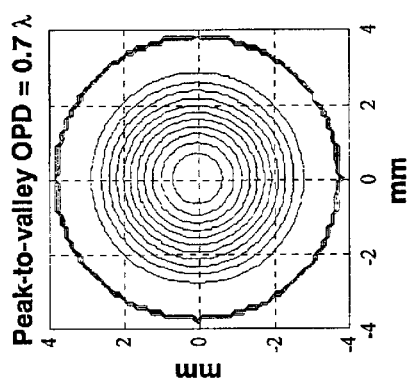
Figure 10A (Prior Art)
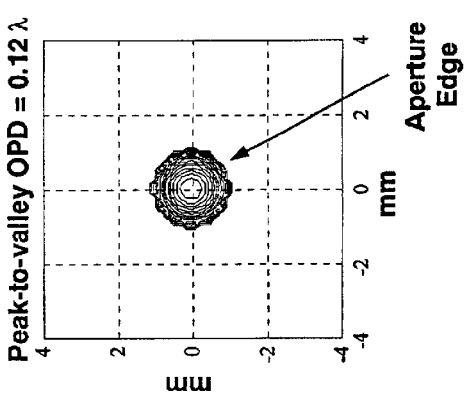
Figure 10B (Prior Art)

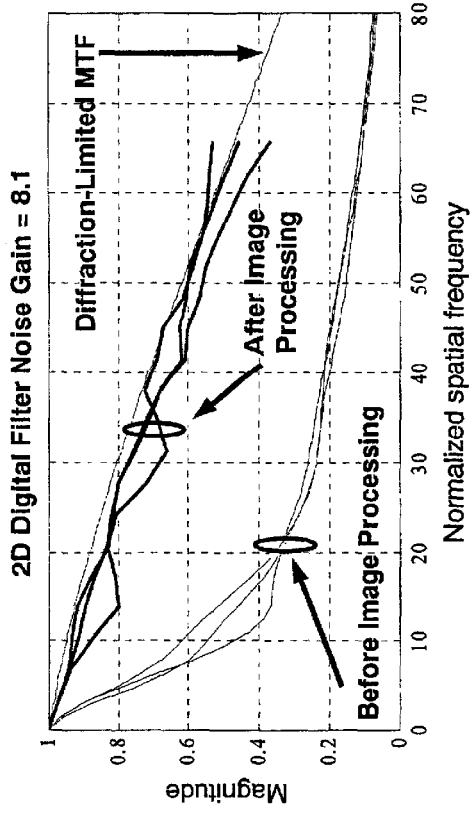
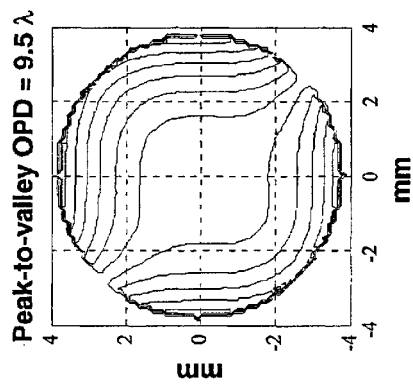
Figure 11A (Prior Art)
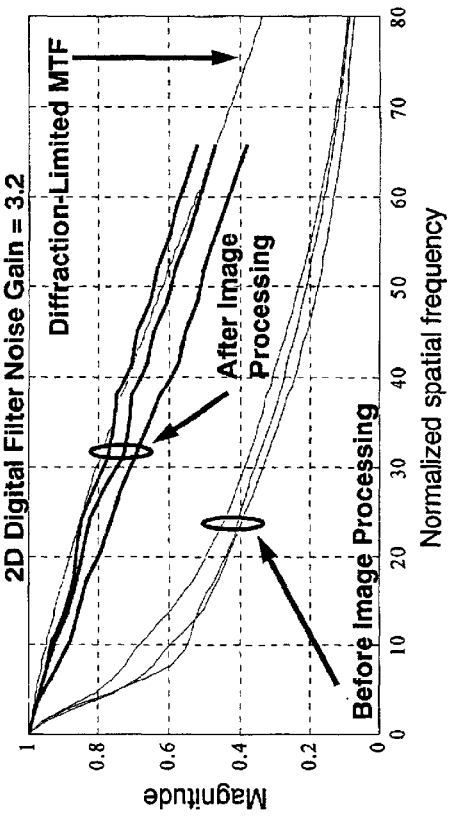
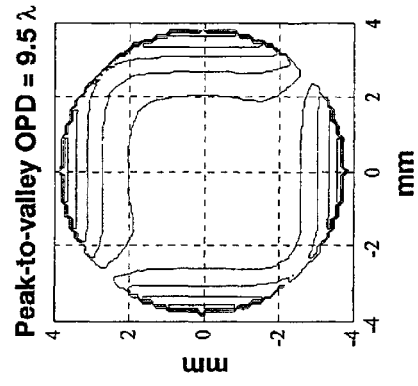
Figure 11B

WAVEFRONT CODING OPTICS

CROSS-REFERENCE TO RELATED APPLICATIONS

U.S. Pat. No. 5,748,371, issued May 5, 1998 and entitled "Extended Depth of Field Optical Systems," and U.S. Pat. No. 6,021,005, issued Feb. 1, 2000 and entitled "Antialiasing Apparatus and Methods for Optical Imaging," are incorporated herein by reference.

BACKGROUND OF THE INVENTION

1. Field of the Invention

This invention relates to improved Wavefront Coding Optics for controlling focus related aberrations, and methods for designing such Wavefront Coding Optics.

2. Description of the Prior Art

Wavefront Coding is a relatively new technique that is used to reduce the effects of misfocus in sampled imaging systems through the use of Wavefront Coding Optics which operate by applying aspheric phase variations to wavefronts of light from the object being imaged. Image processing of the resulting images is required in order to remove the spatial effects of the Wavefront Coding. The processed images are sharp and clear, as well as being relatively insensitive to the distance between the object and the detector.

Wavefront Coding is also used to control general focus related aberrations to enable simplified design of imaging systems as well as to provide anti-aliasing in sampled imaging systems.

The Wavefront Coding Optics taught and described in prior art, beginning with U.S. Pat. No. 5,748,371, issued May 5, 1998, were discovered by trial and error. The first operative Wavefront Coding mask applied a cubic phase function to the wavefront from the object. It was known that Wavefront Coding Optics, like the cubic mask, needed to apply aspheric, asymmetric phase variations to the wavefronts.

Prior art related to Wavefront Coding systems includes a fundamental description of Wavefront Coding (U.S. Pat. No. 5,748,371), description of Wavefront Coding used for anti-aliasing (Anti-aliasing apparatus and methods for optical imaging, U.S. Pat. No. 6,021,005, Feb. 1, 2000), use of Wavefront Coding in projection systems (Apparatus and methods for extending depth of field in image projection systems, U.S. Pat. No. 6,069,738, May 30, 2000), and the combination of Wavefront Coding and amplitude apodizers (Apparatus and method for reducing imaging errors in imaging systems having an extended depth of field, U.S. Pat. No. 6,097,856, Aug. 1, 2000).

The layout of a conventional Wavefront Coded imaging system is shown in FIG. 1. Imaging Optics 104 collects light reflected or transmitted from Object 102. Wavefront Coding Optics 106 modify the phase of the light before detector 108. Wavefront Coding Optics 106 comprise a cubic mask. Detector 108 can be analog film, CCD or CMOS detectors, etc. The image from detector 108 is spatially blurred because of Wavefront Coding Optics 106. Image processing 110 is used to remove the spatial blur resulting in a final image. i.e., image processing 110 removes the Wavefront Coding applied by optics 106, thereby reversing the effects of optics 106, other than the increase in depth of field and depth of focus. The image before and after Image Processing 110 also is very insensitive to misfocus aberrations. These misfocus aberrations can be due to the Object 102 being beyond the depth of field of the Imaging Optics 104, the detector 108 being beyond the depth of focus of the Imaging Optics 104, or from Imaging Optics 104 having some combination of misfocus aberrations such as spherical aberration, chromatic aberration, petzval curvature, astigmatism, temperature or pressure related misfocus.

FIG. 2 describes a rectangularly separable prior art Wavefront Coding phase function that produces an extended depth of field. This phase function is a simple cubic phase function that is mathematically described, in normalized coordinates, as:

$$\text{cubic-phase}(x,y) = 12\,[x^3 + y^3]$$

$$|x| \leq 1,\ |y| \leq 1$$

Other related forms of the cubic mask are described as:

$$\text{cubic-related-forms}(x,y) = a[\text{sign}(x)|x|^b + \text{sign}(y)|y|^b],$$

where $$|x| \leq 1,\ |y| \leq 1,$$

and $$\text{sign}(x) = +1\ \text{for}\ x \geq 0,\ \text{sign}(x) = -1\ \text{otherwise}$$

These related forms trace out "cubic like" profiles of increasing slopes near the end of the aperture.

The top plot of FIG. 2 describes a 1D slice along an orthogonal axis of the cubic phase function. The lower plot of FIG. 2 describes the contours of constant phase of this cubic phase function.

FIG. 3 shows MTFs as a function of misfocus for a system with no Wavefront Coding and for a system with the conventional Wavefront Coding cubic phase function of FIG. 2. The normalized misfocus values are the same for both systems and are given as $\psi = \{0, 2, 4\}$, where $\psi = [2\text{ pi } W_{20}]$, and where $W_{20}$ is the conventional misfocus aberration coefficient in waves. MTFs with no Wavefront Coding (302) are seen to have a large change with misfocus. MTFs with the rectangularly separable cubic phase function (304) are seen to change much less with misfocus then the system with no Wavefront Coding.

A non-separable prior art form of Wavefront Coding Optics, in normalized coordinates, is:

$$\text{non-separable-cubic-phase}(p, q) = p^3 \cos(3q)$$

$$|p| \leq 1,\ 0 \leq q \leq 2\text{pi}$$

This phase function has been shown to be useful for controlling misfocus and for minimizing optical power in high spatial frequencies, or antialiasing. When using a digital detector such as a CCD or CMOS device to capture image 108, optical power that is beyond the spatial frequency limit of the detector masquerades or "aliases" as low spatial frequency power. For example, say that the normalized spatial frequency limit of a digital detector is 0.5. As seen from FIG. 3, the in-focus MTF from the conventional system with no Wavefront Coding can produce a considerable amount of optical power beyond this spatial frequency limit that can be aliased. By adding misfocus to the system without Wavefront Coding the amount of high spatial frequency optical power can be decreased, and aliasing reduced, as is well known. When using conventional Wavefront Coding, as shown in FIG. 3, the amount of optical power that can be aliased can be decreased (304) compared to the system without Wavefront Coding (302).

Image Processing function 110 essentially applies amplification and phase correction as a function of spatial frequency to restore the MTFs before processing to the in-focus MTF from the conventional system with no Wavefront Coding after processing, or to some other application specific MTF, if desired. In effect, the Image Processing function of FIG. 1 removes the Wavefront Coding blur in the detected image.

In practice the amplification applied by the Image Processing function increases the power of the deterministic image but also increases the power of the additive random noise as well. If Image Processing 110 is implemented as a linear digital filter then a useful measure of the increase of power of the additive random noise is called the Noise Gain of the digital filter. The concept of "noise gain" is commonly used in radar systems to describe the amount of noise power at the output of radar digital processors. Nonlinear implementations of Image Processing 110 have similar types of noise-related measures. The Noise Gain for a digital filter is defined as the ratio of the root-mean-square (RMS) value of the noise after filtering to the RMS value of the noise before filtering. In general the Noise Gain is nearly always greater than one in Wavefront Coded systems. Assuming that the additive noise is uncorrelated white gaussian noise, the Noise Gain of a two dimensional linear digital filter can be shown to be equal to:

$$\text{Noise Gain} = \text{sqrt}[\Sigma\Sigma f(i,k)^2] = \text{sqrt}[\Sigma\Sigma |F(w_i,w_k)|^2]$$

where $$[\Sigma\Sigma f(i,k)] = F(0,0) = 1.0,$$

$f(i,k)$ is a spatial domain digital filter, $F(w_i,w_k)$ is the equivalent frequency domain digital filter, and the first sum is over the index i or k and the second sum is over the other index. Indices $(i,k)$ denote spatial domain coordinates while indices $(w_i,w_k)$ denote frequency domain coordinates. The constraints that the sum of all values of the filter and the zero spatial frequency filter value both equal unity ensures that the zero spatial frequency components of the image (the background for example) are unchanged by the image processing.

Wavefront Coded MTFs that have the highest values require the least amplification by the digital filter and hence the smallest Noise Gain. In practice the Wavefront Coding Optics that produce MTFs that have small changes over a desired amount of misfocus and also have the highest MTFs are considered the best and the most practical Optics for Wavefront Coding. Optics that produce MTFs that have small changes with misfocus but also very low MTFs are impractical due to very large Noise Gain of the resulting digital filters. Digital filters with large Noise Gain will produce final images that have unnecessarily high levels of noise.

While the conventional cubic Wavefront Coding mask does operate to increase depth of field and control focus related aberrations, there remains a need in the art for improved Wavefront Codings Optics, which retain the capacity to reduce focus-related aberrations, while also producing high value MTFs. There also remains a need in the art for methods of designing such improved Wavefront Coding Optics.

SUMMARY OF THE INVENTION

An object of the present invention is to provide improved Wavefront Coding Optics, which retain the capacity to reduce focus-related aberrations, while producing high value MTFs, and to provide methods of designing such improved Wavefront Coding Optics.

Improved Wavefront Coding Optics according to the present invention, which apply a phase profile to the wavefront of light from an object to be imaged, retain their insensitivity to focus related aberrations, while increasing the resulting MTFs. Such improved Wavefront Coding Optics have the characteristic that the central portion of the applied phase profile is essentially constant, while the edges of the phase profile have alternating negative and positive phase regions (e.g. turn up and down at respective profile ends).

To achieve higher MTFs, control misfocus and misfocus aberrations, and improve antialiasing characteristics, the central group of rays should be left unmodified by the Wavefront Coding Optics. In order to increase the light gathering (and possibly spatial resolution) of the full aperture system, the outer rays need to be modified. Only these outer rays need to be modified in order to increase the light gathering while keeping the depth of field and/or aliasing characteristics constant.

BRIEF DESCRIPTION OF THE DRAWINGS

FIG. 2 (prior art) shows a 1D plot of the Wavefront Coding cubic phase function of FIG. 1 and a contour plot of the 2D representation of this function.

FIG. 5A shows the ray paths for a linear region phase function according to the present invention.

FIG. 5B shows the ray paths for a cubic region phase function according to the present invention.

FIGS. 10A and 10B (prior art) show contour plots of the exit pupils and corresponding MTFs as a function of field angle for the full aperture (10A) and stopped down (10B) Cooke triplet lens of FIG. 9.

FIGS. 11A and 11B show contour plots of the exit pupils and corresponding MTFs as a function of field angle for the prior art cubic phase Wavefront Coding system of FIG. 1 (11A) and the improved cubic region Wavefront Coding system of FIG. 8 (11B).

DETAILED DESCRIPTION OF THE PREFERRED EMBODIMENTS

There are an infinite number of Wavefront Coding Optics that will reduce the variation in the resulting MTFs and PSFs of a given optical system due to misfocus or misfocus aberrations. Many of the possible optics are impractical in that the required Image Processing function 110 used to remove the Wavefront Coding blur from detected images would amplify the additive noise in practical images beyond an acceptable level. Improved forms of Wavefront Coding Optics that can control misfocus and misfocus aberrations, that can lead to higher MTFs, and that have improved antialiasing characteristics, as well as new methods of Wavefront Coding design, are shown in FIGS. 5 through 9. Use of these improved forms of Wavefront Coding Optics and design methods to control the misfocus aberrations with a Cooke triplet lens are shown in FIGS. 9 through 11.

The improved Wavefront Coding Optics according to the present invention share the characteristic that the central region of the applied phase profile is essentially constant, while the edges of the phase profile have alternating positive and negative phase regions. Such Wavefront Coding Optics retain the ability to reduce focus related aberrations, but also have considerably higher MTFs than traditional Wavefront Coding Optics, thus reducing noise in the final images produced.

Wavefront Coding Optics (in the form of aspheric optical elements) are placed at or near the aperture stop of optical systems (or at or near an image of the aperture stop) in order to redirect light rays as a function of spatial position. The aspheric optical elements can be constructed of optical glass or plastic with varying thickness and/or index of refraction. The optics can also be implemented with shaped mirrors, spatial light modulators, holograms, or micro mirror devices. U.S. Pat. No. 6,021,005, issued Feb. 1, 2000 and entitled "Antialiasing Apparatus and Methods for Optical Imaging," provides descriptions of a variety of devices for applying variations to a wavefront of light from an object.

Figure 4:
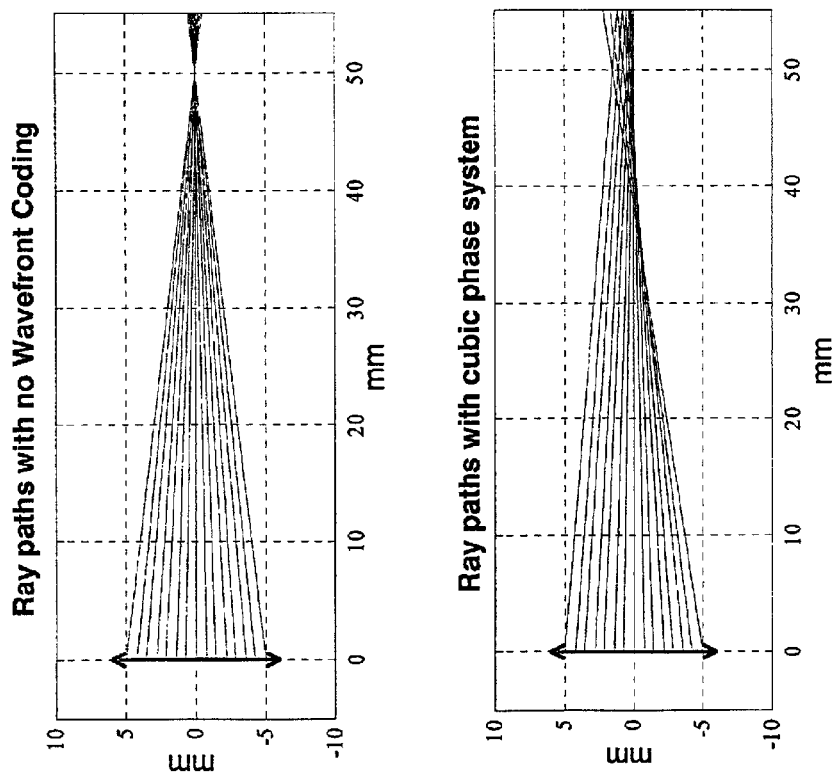
FIG. 4 (prior art) shows the ray paths for a system with no Wavefront Coding and with the conventional Wavefront Coding cubic phase function shown in FIG. 2.

Light rays from an ideal thin lens with no Wavefront Coding converging to focus 50 mm from the lens are shown on the top graph of FIG. 4. All rays from the ideal system without Wavefront Coding travel towards the best focus position on the optical axis. The light rays from a conventional (prior art) rectangularly separable cubic phase system are shown on the bottom graph of FIG. 4. Notice that the rays from the top half of this lens cross the optical axis beyond the best focus point of the conventional lens (or 50 mm). The rays from the bottom half of this lens cross the optical axis before the best focus point of the conventional lens.

Since no two rays from the prior art Wavefront Coding system cross the optical axis at the same point, every ray of the prior art Wavefront Coding cubic phase system is being modified when compared to the system not using Wavefront Coding (except the on-axis zero-slope ray). To achieve higher MTFs, control misfocus and misfocus aberrations, and improve antialiasing characteristics, the central group of rays should be left unmodified.

Consider a full aperture and a stopped down conventional optical system that does not use Wavefront Coding. Assume that a particular application has a depth of field (or depth of focus) and/or antialiasing requirement that the full aperture system cannot meet. It is well known that stopping down the lens will increase the depth of field of the system while reducing the potential spatial resolution of the optics. Stopping down the aperture also reduces the optical power available at the detector. There is a particular stopped down aperture where the imaging system has a best fit to the depth of field and/or antialiasing characteristics required. The light rays that pass through the aperture of the stopped down system are then considered suitable from a depth of field and/or antialiasing perspective for the particular application.

In order to increase the light gathering (and possibly spatial resolution) of the full aperture system, the rays of the full aperture system that lay outside the stopped down aperture need to be modified. Only those rays that lay outside the stopped down aperture need to be modified in order to increase the light gathering while keeping the depth of field and/or aliasing characteristics constant. When the rays within the stopped down aperture are modified, as in all prior art Wavefront Coding Optics, the resulting MTFs are not as high as possible, the resulting Noise Gains are not as low as possible, and the resulting images are more noisy than necessary.

By not modifying the central rays of Wavefront Coding systems the resulting MTFs below the spatial frequency limit of the digital detector can be increased over prior art Wavefront Coding systems. Only the rays outside of the central region of the aperture need to be modified in order to control misfocus or misfocus aberrations. The central region is defined as the general region of a stopped down aperture where a system would have a suitable depth of field, depth of focus, or antialiasing characteristics for a particular application, albeit with reduced light gathering and spatial resolution.

Improved rectangularly separable Wavefront Coding Optics can be most generally described mathematically through phase functions, in normalized coordinates, that have the form:

$$\text{phase}(x,y) = \Sigma[U(|x|/A_{xi}) \, G_{xi}(x) + U(|y|/A_{yi}) \, G_{yi}(y)]$$

where $$|x| \leq 1, \, |y| \leq 1$$

$$i = 1, 2, \ldots, N$$

and where $$U(z) = 1 \text{ if } z \geq 1, \, U(z) = 0 \text{ otherwise}$$

$$0 < A_{xi} < 1, \, 0 < A_{yi} < 1$$

The sum is over the index i. The function $U(|x|/A_x)$ is a zero/one step function that has a value of zero inside of an aperture of length $2 A_x$ and has a value of one outside of this aperture. The functions $G_x$ and $G_y$ are general functions that modify the rays of the system outside of the specific aperture defined by $A_x$ and $A_y$. The aperture shape in this form is described by a rectangle for mathematical convenience, but in general can be described by any closed shape. For example, instead of a rectangular aperture, a circular, elliptical, or multi-sided polygonal aperture can also be be used.

In order for the phase function to control misfocus effects, the phase functions $G_x$ and $G_y$ should be designed so that groups of rays from specific regions of the aperture cross the optical axis either before or after the point of best focus when no Wavefront Coding is used.

With these concepts, a number of improved rectangularly separable Wavefront Coding Optics can be formed. These optics differ in the composition of the general functions $G_x$ and $G_y$. For example, a linear phase region optical system can be described as:

$$\text{linear-phase-region}(x, y) = U(|x|/A_x)\text{sign}(x)(|x|-A_x)/$$
$$(1-A_x) + U(|y|/A_y)$$
$$\text{sign}(y)(|y|-A_y)/(1-A_y)$$

where $|x| \leq 1, |y| \leq 1$ $U(z)=1$ if $z \leq 1$, $U(z)=0$ otherwise $\text{sign}(z)=+1$ for $z \geq 0$, $\text{sign}(z)=-1$ otherwise $0 < A_x < 1, 0 < A_y < 1$ The linear phase region system has zero phase inside of the aperture defined by $A_x$ and $A_y$ with linearly changing phase as a function of spatial position variables x and y outside of this aperture. The linear phase region system delivers extended depth of field with high MTFs below the spatial frequency limit of the digital detector. This system also has a very simple physical form that can be preferred over smoothly varying forms because of the fabrication process or physical implementation being used.

For example, if fabrication of the Wavefront Coding Optics is done with a precision milling machine, the linear phase region optics would be preferred over the cubic phase optics because the linear phase region optics have only fixed surface slopes while the cubic phase optics have continuously changing surface slopes. Often, optical elements with fixed surface slopes are easier to fabricate than elements with continuously changing slopes. If the Wavefront Coding optical surface is implemented with micro mirrors or similar, the small number of surface slopes of the linear phase region system can be more easily implemented than the continuously changing surface slopes of the prior art cubic phase optics.

Another version of improved rectangularly separable Wavefront Coding Optics is mathematically described by the sum of powers region phase function. This phase function is defined as:

$$\text{sum-of-powers-region}(x, y) = \Sigma U(|x|/A_{xi})\alpha_i \text{sign}(x)[(|x|-A_{xi})/$$
$$(1-A_{xi})]^{\beta_i} + \Sigma U(|y|/A_{yi})\chi_i$$
$$\text{sign}(y)[(|y|-A_{yi})/(1-A_{yi})]^{\delta_i}$$

where $|x| \leq 1, |y| \leq 1$ i1, 2, ..., N $U(z)=1$ if $z \leq 1$, $U(z)=0$ otherwise $\text{sign}(z)=+1$ for $z \geq 0$, $\text{sign}(z)=-1$ otherwise $0 < A_{xi} < 1, 0 < A_{yi} < 1$ and where the summations are over the index i.

Figure 6:
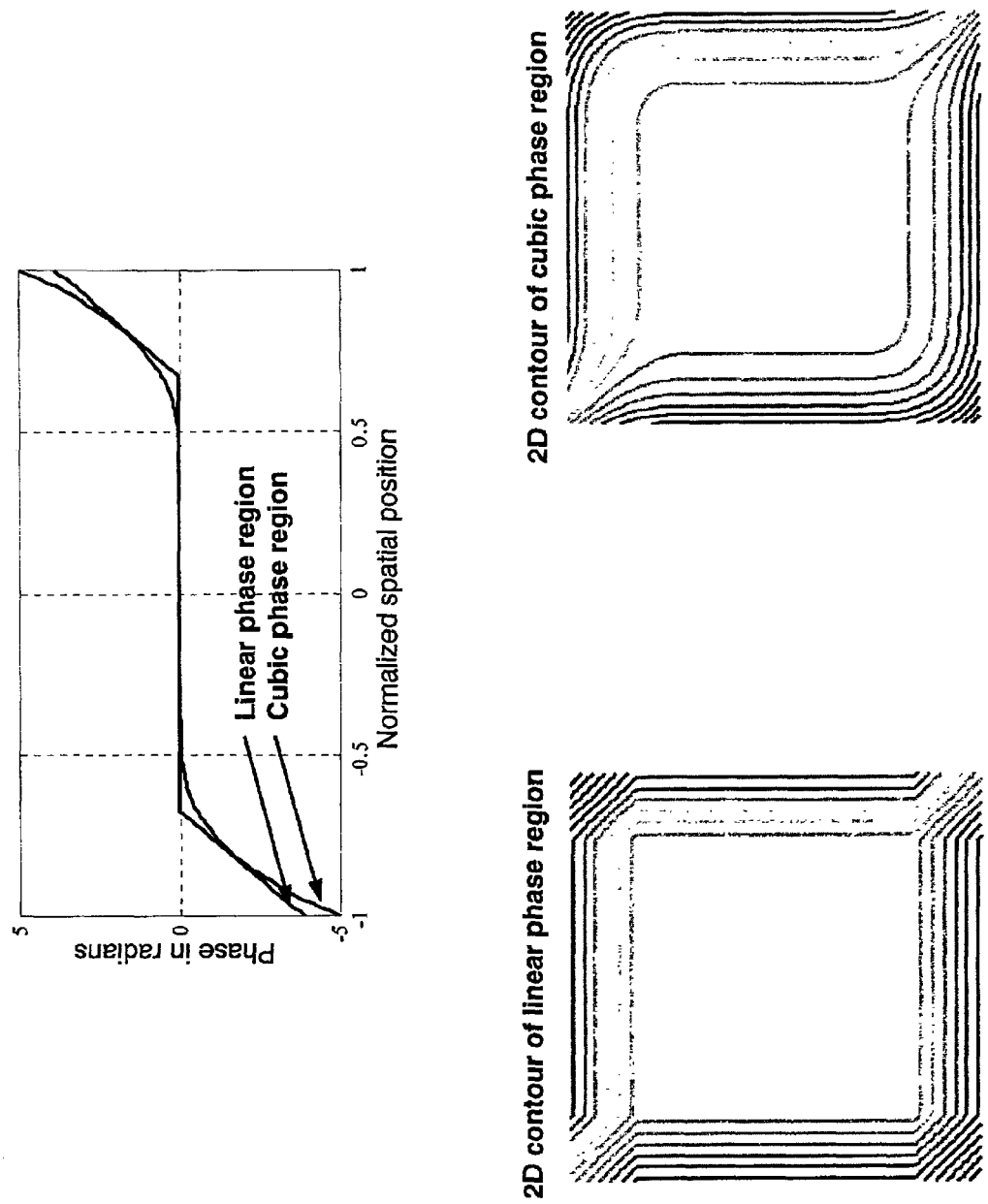
FIG. 6 shows 1D plots of the linear region and cubic region phase profiles of FIGS. 5a and 5b, as well as contour plots of the 2D representations of these Wavefront Coding functions.
Figure 7:
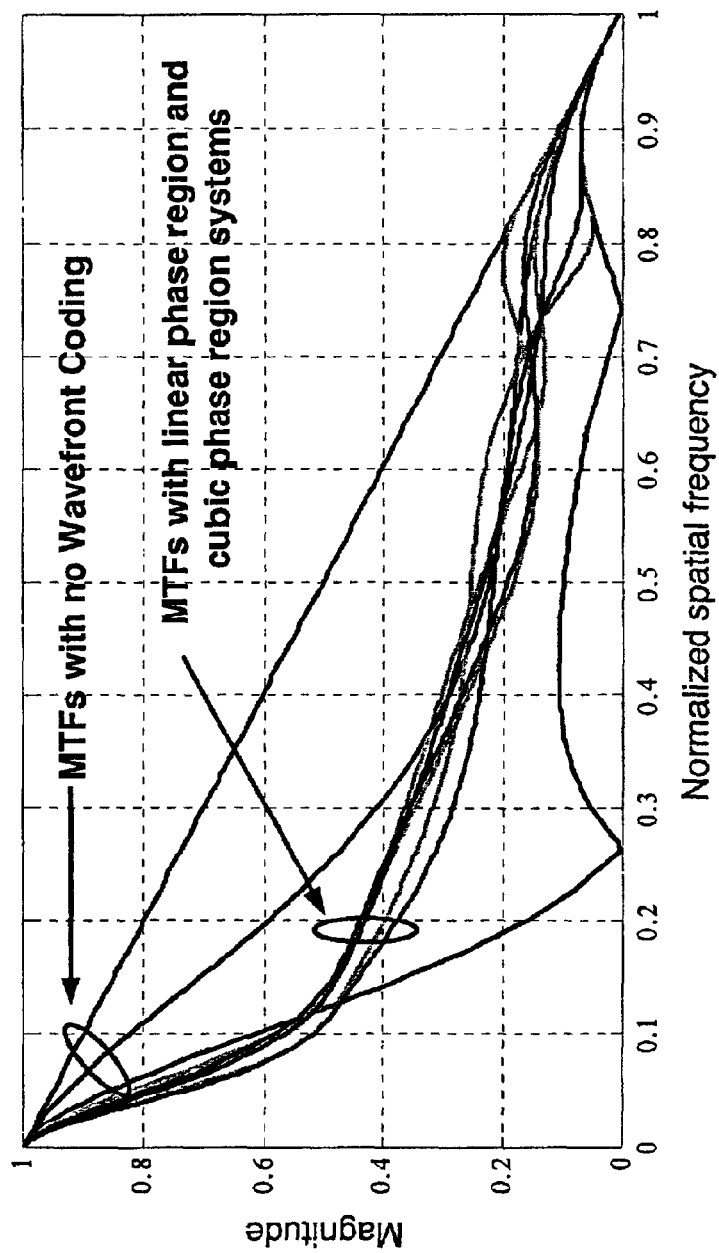
FIG. 7 shows MTFs as a function of misfocus for a system with no Wavefront Coding and with the linear region and cubic region Optics of FIGS. 5a and 5b.

Examples of the linear phase region systems and the sum of powers region systems are found in FIGS. 5, 6, and 7. The graph of FIG. 5A shows the ray paths from one dimension of the linear phase region system. The graph of FIG. 5B shows the ray paths for one dimension of a cubic phase region system. A cubic phase region system is sum of powers phase region system with only a single term and the exponent on this term having the value of 3, or $\beta_i=\delta_i=3$, and $\alpha_i=\chi_i=0$ for $i \neq 1$.

From FIG. 5A we see that the rays from the central region of the lens (with this central region extending from −2.5 to +2.5 mm) are not modified by the linear phase region system. All the unmodified rays travel towards the optical axis at the best focus position 50 mm to the right of the lens. Only the outer rays from the lens, those beyond +/−2.5 mm, are modified by the linear phase region function. The rays from the top of the lens are modified so that they cross the optical axis at points beyond the best focus position. The rays from the bottom of the lens cross the optical axis at points before the best focus point.

From FIG. 5B, the cubic phase region system also does not modify the central region (extending from −2.5 mm to +2.5 mm) of the lens. The remaining rays are modified in a spatially varying manner such that one set of rays (from the top of the lens) crosses the optical axis at points beyond the best focus point and another set of rays (from the bottom of the lens) crosses the optical axis at points before the best focus position.

The linear phase region system and the sum of powers phase region system can consist of different regions that have different slopes and/or different number of terms. For example, the linear phase region system, as shown in FIG. 5A, instead of having a zero phase central region and two linearly changing regions, could have a zero phase central region and more than two linearly changing regions. Additional linear regions could direct the rays to different positions in order to better control misfocus, misfocus aberrations, and antialiasing characteristics. The size and shape of the misfocus PSFs can also be visualized and controlled by controlling regions of phase function and the corresponding rays. When only two asymmetric regions of the phase function are being used (as in FIG. 5A), manual optimization is possible. When the number of regions exceeds two, then the number, size, and phase of each region is generally best determined by computer optimization.

FIG. 6 gives another view of the linear phase region and cubic phase region Wavefront Coding systems. The top graph of FIG. 6 shows a 1D slice of phase functions describing the optics of both systems along one of the orthogonal axes. The 1D form of this linear phase region system is:

$3.86\ U(|x|/A_x)\ \text{sign}(x)\ [(|x|-A_x)/(1-A_x)]$ where $A_x = \frac{2}{3}$ $|x| \leq 1$ $U(z)=1$ if $z \leq 1$, $U(z)=0$ otherwise $\text{sign}(z)=+1$ for $z \geq 0$, $\text{sign}(z)=-1$ otherwise The 1D form for the cubic phase region system is specifically:

$5\ U(|x|/A_x)\ \text{sign}(x)\ [(|x|-A_x)/(1-A_x)]^3$ $A_x = \frac{1}{3}$ $|x| \leq 1$ $U(z)=1$ if $z \leq 1$, $U(z)=0$ otherwise $\text{sign}(z)=+1$ for $z \geq 0$, $\text{sign}(z)=-1$ otherwise The 2D contours of constant phase for these phase functions are shown in the bottom of FIG. 6. These contours clearly show that the phase within the central regions of these systems are constant; i.e. the central rays of the corresponding Wavefront Coding systems are not modified. The phase near the edges of the linear phase region system increases/decreases linearly while the phase near the edges of the cubic phase region system increases/decreases as a cubic function.

Figure 1:
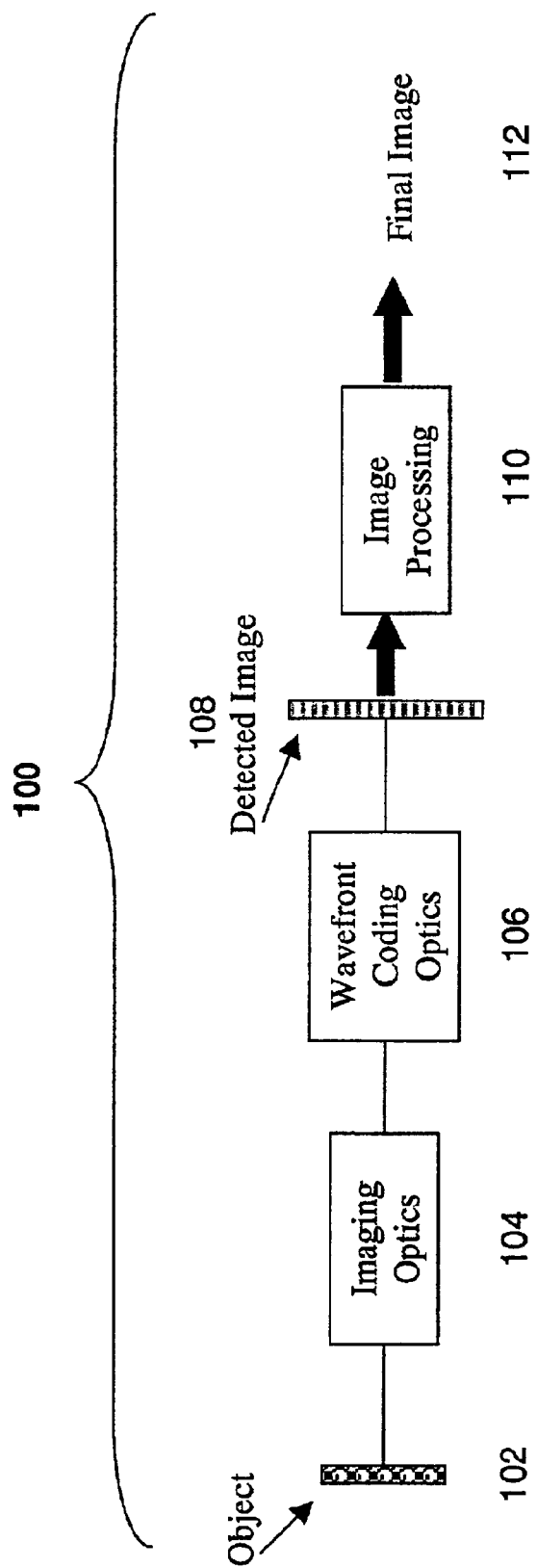
FIG. 1 (prior art) shows a conventional prior art Wavefront Coding imaging system.
Figure 3:
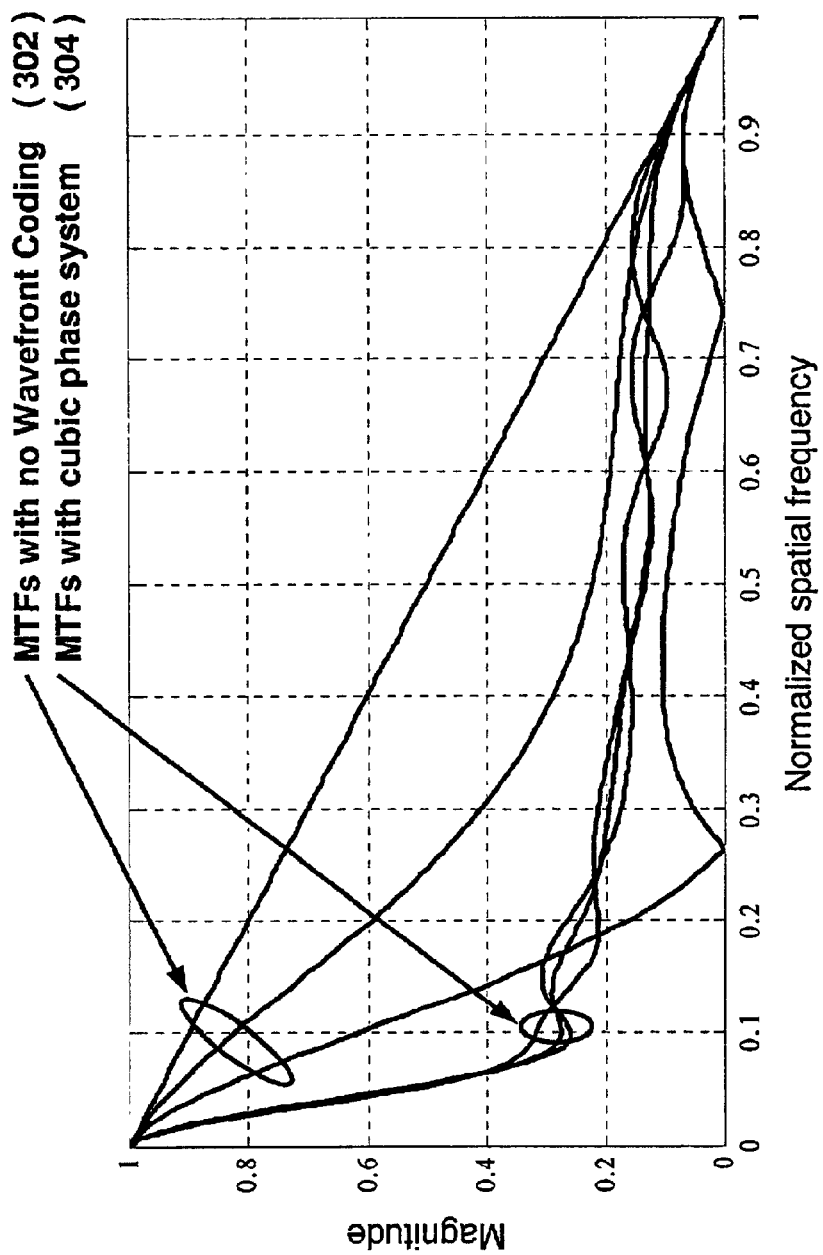
FIG. 3 (prior art) shows MTFs as a function of misfocus for a system with no Wavefront Coding and with the conventional Wavefront Coding cubic phase function of FIG. 2.

FIG. 7 shows the misfocus MTFs as a function of normalized misfocus for the system with no Wavefront Coding, the linear phase region system, and the cubic phase region system. The normalized misfocus values are $\psi=\{0, 2, 4\}$, as used in FIG. 3. The MTFs from both the linear phase region and cubic phase region systems are very close to each other (and thus are not specifically distinguished in FIG. 7) and are very insensitive to misfocus, especially when compared to the system using no Wavefront Coding. Compare the heights of the improved Wavefront Coded MTFs of FIG. 7 to those of the prior art cubic phase Wavefront Coded MTFs shown in FIG. 3. The MTFs from both the linear phase region and the cubic phase region systems have higher MTFs than the conventional cubic phase function MTFs while all the Wavefront Coding MTFs are essentially insensitive to misfocus. In terms of antialiasing, the MTFs from the improved linear phase region and cubic phase region systems have higher values of MTFs, compared to the prior art cubic phase MTFs, for the lower spatial frequencies that typically are not aliased, while also reducing the high spatial frequency optical power when compared to the system with no Wavefront Coding.

Improved non-separable Wavefront Coded Optics can also be described. General non-separable Wavefront Coded Optics can be mathematically defined through the form:

$$\text{phase}(\rho, \theta) = \Sigma Q(\rho/\underline{\Omega}_i) G_i(\rho, \theta)$$

where $|\rho| \leq 1, 0 \leq \theta \leq 2\text{pi}$ $i=1, 2, \ldots N$ where $Q(z)=1$ if $z \geq 1$, $Q(z)=0$ otherwise $0 < \underline{\Omega}_i 21\ 1$ and where the sum is over the index i. The function $Q(\rho/\underline{\Omega})$ is a zero/one function that allows the central rays from a region with radius less than $\underline{\Omega}$ to be unchanged. The function $G_i(\rho, \theta)$ is a general phase function that has regions of positive and negative phase so that regions of rays are made to either cross the optical axis before the best focus image point, or after the best focus image point.

One general example of improved non-separable Wavefront Coded Optics is mathematically described as:

$$\text{non-separable-phase}(\rho, \theta) = \Sigma Q(\rho/\underline{\Omega}_i) \alpha_i \rho^{\beta_i} \cos(w_i \theta - \phi_i)$$

where $|\rho| \leq 1, 0 \leq \theta \leq 2\text{pi}$ $i=1, 2, \ldots N$ and where $Q(z)=1$ if $z \geq 1$, $Q(z)=0$ otherwise $0 < \underline{\Omega}_i < 1$ Another example of improved non-separable Wavefront Coded Optics is the non-separable sum of powers form given by:

$$\text{non-separable-sum-of-powers}(\rho, \theta) = \Sigma Q(\rho/\underline{\Omega}_i) \alpha_i \, \text{sign}_{angle}(M\theta - \text{offset}) \, [(\rho - \underline{\Omega}_i)/(1 - \underline{\Omega}_i)]^{\beta_i}$$

where $|\rho| \leq 1, 0 \leq \theta \leq 2\text{pi}$ $i=1, 2, \ldots, N$ and where $Q(z)=1$ if $z \geq 1$, $Q(z)=0$ otherwise $0 < \underline{\Omega}_i < 1$ $\text{sign}_{angle}(\Phi)=+1$ if $0 \leq \Phi \leq \text{pi}$, $\text{sign}_{angle}(\Phi)=-1$ otherwise where the integer M controls the number of +/− sectors used and where the sum is over the variable i.

Figure 8:
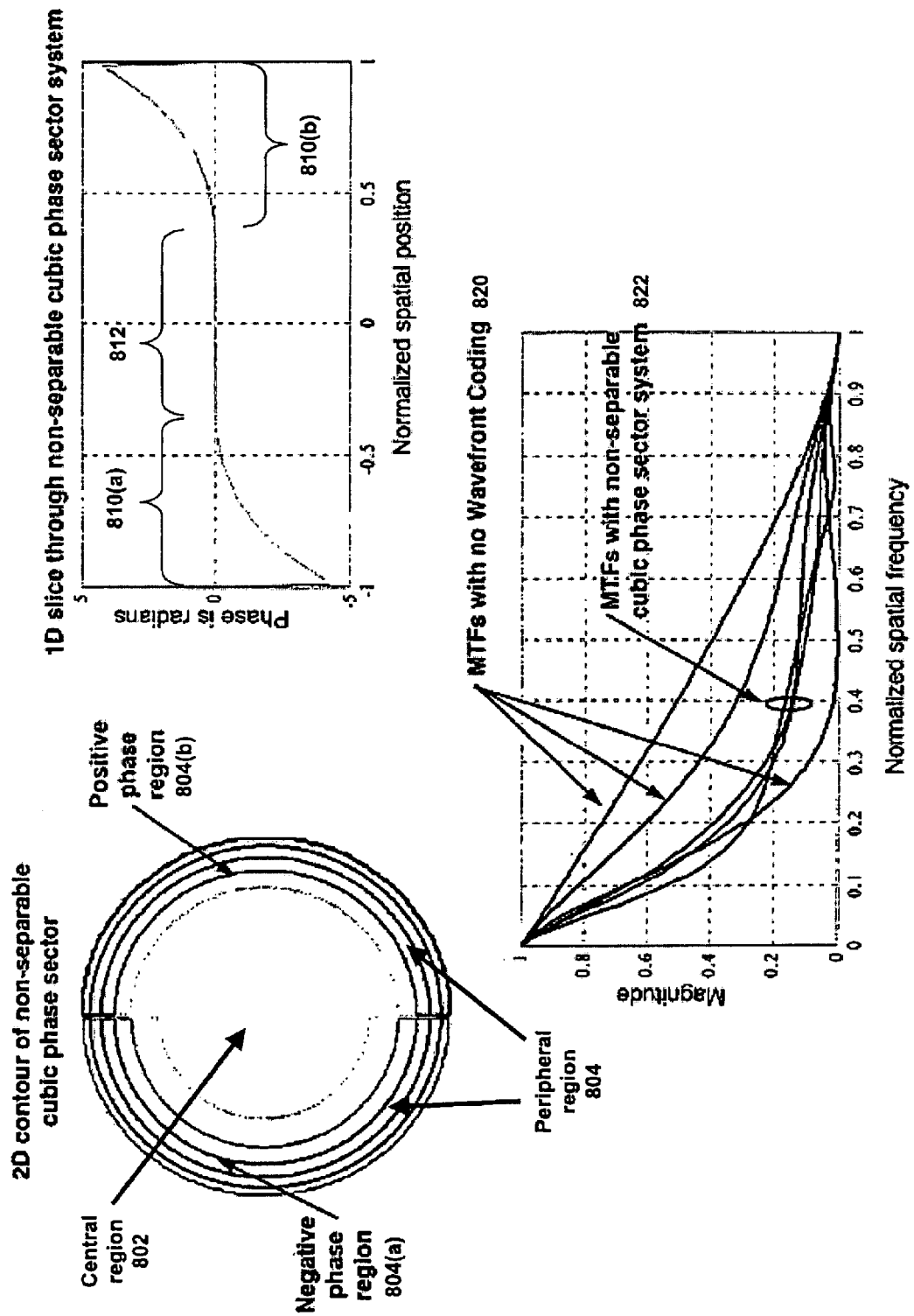
FIG. 8 shows a contour plot of an improved non-separable phase function according to the present invention, a plot of a 1D slice through the non-separable phase function, and the MTFs as a function of misfocus for a non-separable cubic sector phase function.
Figure 9:
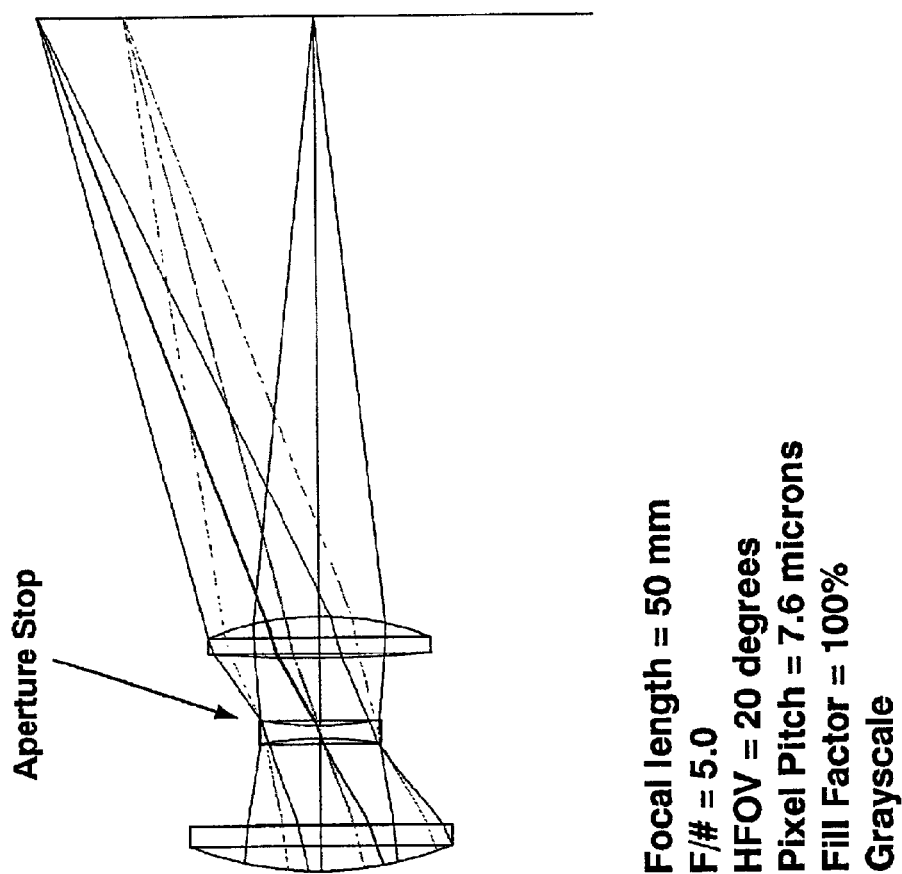
FIG. 9 (prior art) shows a drawing of a conventional Cooke triplet lens.

An example of the improved non-separable sum of powers Wavefront Coded Optics is given in FIG. 8. The upper left graph in FIG. 8 is a contour plot of constant phase of the non-separable cubic phase sector system showing a central region 802 and a peripheral region 804 (which includes a negative phase region 804(a) and a positive phase region 804(b)). The cubic phase sector system is the non-separable sum-of-powers system with one exponential term, with $\beta=3$. M=1, and offset=pi/2. The parameters of this non-separable cubic phase sector system are:

$$4.48 \, Q(\rho/\underline{\Omega}) \, \text{sign}_{angle}(\theta\text{-pi2})[(\rho - \underline{\Omega})/(1 - \underline{\Omega})]^3$$

$\underline{\Omega}=0.2$ $|\rho| \leq 1, 0 \leq \theta \leq 2\text{pi}$ and where $Q(z)=1$ if $z \geq 1$, $Q(z)=0$ otherwise $\text{sign}_{angle}(\Phi)=+1$ if $0 < \Phi < \text{pi}$, $\text{sign}_{angle}(\Phi)=-1$ otherwise The top right graph of FIG. 8 shows a 1D slice through the cubic phase sector system: regions 810(a), 812 and 810(b) show the values of phase with respect to normalized spatial position that correspond to negative phase region 804(a), central region 802, and positive phase region 804(b), respectively, in the upper left graph of FIG. 8. The bottom graph of FIG. 8 shows the misfocus MTFs of a system with no Wavefront Coding (820) and with the non-separable cubic phase sector system (822). Again the normalized misfocus values are $\Psi=\{0, 2, 4\}$, as used in FIGS. 3 and 7. These MTFs are 1D slices from MTFs formed with circular apertures. The MTFs for the system with the non-separable cubic phase sector system are seen to be very insensitive to misfocus effects, especially when compared to the MTFs from the system with no Wavefront Coding.

FIGS. 9, 10, and 11 describe one example of using the improved Wavefront Coding Optics to control misfocus aberrations. This example shows control of field-dependent aberrations with a common Cooke triplet lens used for visible light. See Modern Optical Engineering (Warren J. Smith, McGraw-Hill, Inc, NY, 1990) for more information on the Cooke triplet. A drawing of this lens is given in FIG. 9. The Noise Gain resulting from the improved Wavefront Coding Optics, as compared to prior art Wavefront Coding Optics, are shown to be a factor of 2.5 less than prior art systems with this lens. This reduced noise gain directly translates into final images that have 2.5 times less noise that prior art systems.

This triplet uses all spherical surfaces except for the second surface second or middle lens, which contains the Wavefront Coding Optics. The prescription of the triplet lens without Wavefront Coding Optics is given by:

| Surface # | Radius | Thickness | Glass | Diameter |
|---|---|---|---|---|
| Object | | Infinity | | |
| 1 | 22.01359 | 3.258956 | SK16 | 17.10986 |
| 2 | −435.7604 | 6.007551 | | 15.98699 |
| 3 | −22.21328 | 0.9999746 | F2 | 7.990108 |
| 4* | 20.29192 | 4.750409 | | 7.731661 |
| 5 | 79.6836 | 2.952076 | SK16 | 13.78242 |
| 6 | −18.3783 | 42.18171 | | 14.5162 |
| Image | | | | |

*Surface #4 is the aperture stop

All dimensions are given in units of mm. The focal length of this lens is 50 mm, the full aperture F/# is 5, the half field of view is 20 degrees. This lens is used in a system with a digital gray scale detector. The pixel pitch is 7.6 microns with 100% fill factor square pixels. The spatial frequency limit of this detector is 65.8 lp/mm. The ambient temperature is considered fixed at 20 degrees C with one atmosphere of pressure. Ideal fabrication and assembly are also assumed.

Even though the lens of FIG. 9 is a fairly complicated multi-glass optical system, this system suffers from the monochromatic misfocus aberrations of spherical aberration, petzval curvature, and astigmatism that limit off-axis performance. If the lens were designed with a single optical material, instead of the two different materials actually used, the lens would also suffer increased chromatic aberration. If plastic optics were used in place of glass optics the lens would also suffer from temperature related misfocus effects.

FIG. 10A (prior art) shows the performance of the system of FIG. 9 operating at F/5 (wide open) and FIG. 10B shows the system of FIG. 9 with the aperture stopped down to F/19. Each of the following graphs are related to measures of the lens with green light. A contour plot of the on-axis exit pupil optical path difference (OPD) for the F/5 system is given on the left of FIG. 10A. The peak-to-valley OPD for this exit pupil has a value of approximately 0.7λ. The right plot of FIG. 10A describes the MTFs for the F/5 system as a function of field angle for on-axis, 14 degrees, and 20 degrees. Included in these MTFs, and all following MTFs, is the pixel MTF related to the 100% fill factor 7.6 micron square pixel. Only 1D slices along the horizontal axis of the 2D diffraction limited MTFs and the 2D Wavefront Coded MTFs are shown in FIGS. 10 and 11. The MTFs as a function of field angle are seen to vary greatly due to the presence of aberrations in the conventional F/5 system.

The effect of stopping down the lens from F/5 to F/19 is seen in the graphs of FIG. 10B. The peak-to-valley OPD of the on-axis stopped down exit pupil is reduced to 0.12λ. The MTFs as a function of field angle of the stopped down system are seen to change very little, compared to the full aperture system. Stopping down the aperture is one way of controlling the aberrations of this system, although at a reduction factor of $(5/19)^2$ or a loss of 93% of the optical power that was captured by the full aperture system.

FIGS. 11A and 11B show the performance of the Cooke triplet of FIG. 9, modified to utilize Wavefront Coding. The Wavefront Coding Optics for this example were modelled as being added to the aperture stop of the system which is at second surface of the second element, or surface #4. The surface height equations for the prior art Wavefront Coding cubic phase system used in FIG. 11A are:

$$Z_{prior\ art}(x,y) = 8.6061E\text{-}5\{|x|^3 + |y|^3\}$$

$$|x| < 5.45,\ |y| < 5.45$$

where the surface height $Z_{prior\ art}(x,y)$ is given in mm. The optical area that is used is a circle of radius 3.86 mm. A square aperture can also be used in practice.

The surface equations for the improved Wavefront Coding cubic phase region system used in FIG. 11B are:

$$Z_{improved}(x,y) = 7.6535E\text{-}5U(|x|)\ \text{sign}(x)\ [|x|-1]^3 + 7.653\ E\text{-}5\ U(|y|)\ \text{sign}(y)\ [|y|-1]^3$$

$$|x| < 5.45,\ |y| < 5.45$$

$U(z) = 1$ if $z \geq 1$, $U(z) = 0$ otherwise $\text{sign}(z) = +1$ for $z \geq 0$, $\text{sign}(z) = -1$ otherwise where again the surface height $Z_{improved}(x,y)$ is given in mm, the optical area that is used is a circle of radius 3.86 mm, and a square aperture can also be used in practice.

The graphs of FIG. 11A describe use of the prior art rectangularly separable Wavefront Coding cubic phase Optics. The graphs of FIG. 11B describe use of the improved rectangularly separable cubic phase region Wavefront Coding Optics. Use of the improved Wavefront Coding Optics increases the height of the MTFs before image processing 110 and therefore drastically reduces the Noise Gain of the digital filters needed to give the ideal performance after processing, compared to the prior art optics. The improved MTFs also show increased antialiasing performance by having higher optical power below the detector spatial frequency cutoff, with greatly reduced MTFs beyond the detector cutoff, when compared to the conventional full aperture system.

The prior art cubic phase system was designed to have a peak-to-valley OPD over the on-axis wide open (F/5) exit pupil of approximately 9.5λ. The resulting MTFs, before image processing, as a function of field angle are essentially constant, as shown in FIG. 11A, especially compared to the full aperture F/5 system without Wavefront Coding of FIG. 10A. The diffraction limited MTF for this system was chosen as the desired system performance of the Wavefront Coding systems after Image Processing 110. In general, after image processing the resulting PSFs and MTFs in the Wavefront Coding system can have nearly any form. The Image Processing function 110, for this example, implements a 2D linear filter to transform the Wavefront Coding MTFs before image processing to MTFs after image processing that closely match the ideal diffraction limited MTF below the detector spatial frequency cutoff of 65 lp/mm. The resulting Noise Gain values of the digital filters are then used as a figure of merit to judge the two dimensional height of the MTFs compared to the desired diffraction-limited MTFs. For the prior art cubic phase system of FIG. 11A the Noise Gain of the resulting 2D digital filter is 8.1.

The graphs of FIG. 11B describe use of the improved cubic phase region Wavefront Coding Optics. Since the stopped down F/19 system of FIG. 10B has suitable performance for rays within a 2 mm diameter aperture, the cubic phase region system is constant, or has zero phase, over the square aperture region of +/−1.0 mm. This zero phase region corresponds to the aperture of the stopped down F/19 system.

The zero phase region could just as easily be formed into a circle or other geometric shape depending on the application and processing to be used. The square aperture is more consistent with the rectangularly separable nature of the cubic phase region system than a non-separable circular region.

The parameters of the cubic phase region system of FIG. 11B were designed to have similar insensitivity to off-axis misfocus aberrations as the prior art cubic phase system of FIG. 11A. This results in a peak-to-valley on-axis OPD also approximately 9.5λ. The contour plot of the exit pupil on the left of FIG. 11B clearly shows a large region near the center of the aperture that has zero phase as compared to the contour plot from the prior art cubic phase system that is not optically constant over any region in the aperture. The MTFs, before image processing, as a function of field angle for the improved cubic phase region system are seen to be essentially constant. The height of the MTFs resulting from the improved cubic phase region system is also much higher than those from the prior art cubic phase system below the spatial frequency band limit of the 7.6 micron detector, or 65 lp/mm.

The Noise Gain of the 2D digital filter needed to match the performance of the MTFs after filtering to that of the diffraction-limited system has a value of approximately 3.2 for the improved cubic phase region system. Thus, the improved cubic phase region system produces nearly ideal performance in the control of the field dependent aberrations and also drastically reduces the digital filter Noise Gain from the prior art system by a factor of (8.1/3.2), or approximately 2.5. Thus, the additive noise power in the final images after Image Processing 110 will be 2.5 times larger with the prior art system than with the improved cubic phase region Wavefront Coding system.

This large decrease in Noise Gain will result in substantially less noisy final images from the Improved Wavefront Coding Optics as compared to prior art optics. Or, for a constant amount of Noise Gain, the improved Wavefront Coding Optics can control a much larger degree of misfocus than can the prior art optics.

Although not shown, this lens system when modified with Wavefront Coding also substantially corrects misfocus arising from chromatic effects and temperature related effects, as well as reducing the tolerance of the system to manufacture and assembly errors.

What is claimed is:

1. An improved Wavefront Coding system for imaging an object comprising:
   Wavefront Coding Optics having an aperture and including
      a central region, wherein the central region applies an essentially constant phase profile to light from the object passing through the central region, and
      a peripheral region disposed about the central region, wherein the peripheral region applies a phase profile to light from the object that has alternating increasing and decreasing phase relative to the central region, and
      wherein the phase profile applied by the Wavefront Coding Optics alters the optical transfer function of the Wavefront Coding system in such a way that the altered optical transfer function is substantially less sensitive to focus related aberrations than was the unaltered optical transfer function;
   a detector for capturing an image from the Wavefront Coding Optics; and
   a post processing element for processing the image captured by the detector by reversing the alteration to the optical transfer function of the Wavefront Coding system accomplished by the Wavefront Coding Optics.

2. The Wavefront Coding system of claim 1, wherein the central region comprises a rectangular aperture, and the peripheral region forms a rectangular frame around the central region.

3. The Wavefront Coding system of claim 1, wherein the central region comprises a circular aperture, and the peripheral region forms a ring around the central region.

4. The Wavefront Coding system of claim 1, wherein the central region comprises a rectangular aperture, and the peripheral region forms a ring around the central region.

5. The Wavefront Coding system of claim 1, wherein the peripheral region comprises more than one concentric zone.

6. The Wavefront Coding system of claim 1, wherein the phase profile applied by the Wavefront Coding Optics substantially follows the function:

$$\text{phase}(x,y) = \Sigma[U(|x|/A_{xi}) G_{xi}(x) + U(|y|/A_{yi}) G_{yi}(y)]$$

where $|x| \leq 1, |y| \leq 1$ $i=1, 2, \ldots, N$ and where $U(z)=1$ if $z \geq 1$, $U(z)=0$ otherwise $0 < A_{xi} < 1, 0 < A_{yi} < 1$ and where the sum is over the index i.

7. The Wavefront Coding system of claim 1, wherein the peripheral region of the Wavefront Coding Optics applies substantially linear functions.

8. The Wavefront Coding system of claim 7, wherein the phase profile applied by the Wavefront Coding Optics substantially follows the phase function:

$$\text{phase}(x, y) = U(|x|/A_x)\text{sign}(x)(|x| - A_x)/(1 - A_x) + U(|y|/A_y)$$
$$\text{sign}(y)(|y| - A_y)/(1 - A_y)$$

where $|x| \leq 1, |y| \leq 1$ $U(z)=1$ if $z \geq 1$, $U(z)=0$ otherwise $\text{sign}(z)=+1$ for $z \geq 0$, $\text{sign}(z)=-1$ otherwise $0 \leq 1 A_x < 1, 0 < A_y < 1$.

9. The Wavefront Coding system of claim 1, wherein the Wavefront Coding Optics peripheral region applies substantially the sum of powers region phase function:

$$\text{phase}(x, y) = \Sigma U(|x|/A_{xi})\alpha_i \text{sign}(x)[(|x| - A_{xi})/(1 - A_{xi})]^{\beta i} + \Sigma U(|y|/A_{yi})\chi_i$$
$$\text{sign}(y)[(|y| - A_{yi})/(1 - A_{yi})]^{\delta i}$$

where $|x| \leq 1, |y| \leq 1, i=1, 2, \ldots, N$ $U(z)=1$ if $z \geq 1$, $U(z)=0$ otherwise, $\text{sign}(z)=+1$ for $z \geq 0$, $\text{sign}(z)=-1$ otherwise, $0 < A_{xi} < 1$, $0 < A_{yi} < 1$, and where the summations are over the index i.

10. The Wavefront Coding system of claim 9, wherein the Wavefront Coding Optics peripheral region applies substantially the cubic function:

$$\text{phase}(x, y) = U(|x|/A_x)\alpha_i \, \text{sign}(x)[(|x|-A_x)/(1-A_x)]^3 + U(|y|/A_y)\chi_i \, \text{sign}(y)[(|y|-A_y)/(1-A_y)]^3$$

where $|x| \leq 1, \; |y| \leq 1,$ $U(z)=1$ if $z \geq 1$, $U(z)=0$ otherwise, $\text{sign}(z)=+1$ for $z \geq 0$, $\text{sign}(z)=-1$ otherwise, $0 < A_{xi} < 1, \; 0 < A_{yi} < 1.$ 11. The Wavefront Coding system of claim 1, wherein the Wavefront Coding Optics peripheral region applies substantially the function:

$$\text{phase}(\rho,\theta) = \Sigma Q(\rho/\underline{\Omega}_i) \, G_i(\rho,\theta)$$

where $|\rho| \leq 1, \; 0 \leq \theta \leq 2\text{pi}$ $i=1, 2, \ldots N$ where $Q(z)=1$ if $z \geq 1$, $Q(z)=0$ otherwise $0 < \underline{\Omega}_i < 1$ and where the sum is over the index i.

12. The Wavefront Coding system of claim 11, wherein the phase profile applied by the Wavefront Coding Optics substantially follows the function:

$$\text{phase}(\rho,\theta) \Sigma Q(\rho/\underline{\Omega}_i) \, \alpha_i \, \rho^{\beta i} \cos(w_{i\theta-\phi i}).$$

13. The Wavefront Coding system of claim 11, wherein the phase profile applied by the Wavefront Coding Optics substantially follows the function:

$$\text{phase}(\rho,\theta) = \sigma Q(\rho/\underline{\Omega}_i) \text{sign}_{angle}(M_i\theta - \text{offset}) \, G\rho_i(\rho)$$

where $\text{sign}_{angle}(\phi)=+1$ if $0<\phi<\text{pi}$, $\text{Sign}_{angle}(\phi)=-1$ otherwise;

where the integer M controls the number of +/− sectors used around the peripheral region, and offset controls the rotation of the +/− sectors.

14. The Wavefront Coding system of claim 13, wherein the phase profile applied by the Wavefront Coding Optics substantially follows the function:

$$\text{phase}(\rho,\theta) = \sigma Q(\rho/\underline{\Omega}_i)\alpha_i \, \text{sign}_{angle}(M\theta - \text{offset}) \, [(\rho-\underline{\Omega}_i)/(1-\underline{\Omega}_i)]^{\beta i}.$$

15. The Wavefront Coding system of claim 13, wherein the phase profile applied by the Wavefront Coding Optics substantially follows the function:

$$\text{phase}(\rho,\theta) = Q(\rho/\underline{\Omega}) \text{sign}_{angle}(M\theta - \text{offset})[(\rho-\underline{\Omega})/(1-\underline{\Omega})]^3.$$

16. A method of designing improved Wavefront Coding systems comprising the steps of:

designing Wavefront Coding Optics by selecting a central region of the Wavefront Coding Optics such that the central region applies an essentially constant phase profile to light passing through it;

selecting a peripheral region of the Wavefront Coding Optics such that the peripheral region applies a phase profile to light passing through it that alternately increases in phase and decreases in phase relative to the central region;

wherein the phase profile applied by the Wavefront Coding Optics alters the optical transfer function of the Wavefront Coding system in such a way that the altered optical transfer function is substantially less sensitive to focus related aberrations than was the unaltered optical transfer function; and selecting a post processing function for processing images from the Wavefront Coding Optics by reversing an alteration of the optical transfer function accomplished by the Wavefront Coding Optics.

17. The method of claim 16 wherein the peripheral region applies substantially linear phase profiles.

18. The method of claim 17 wherein the peripheral region applies substantially cubic phase profiles.

19. A method for increasing depth of field and controlling focus related aberrations in an imaging system for imaging an object at a detector, the method comprising the steps of:

between the object and the detector, modifying the wavefront of light from the object;

the wavefront modifying step including the steps of applying an essentially constant phase profile to light passing through a central region and applying a peripheral profile that alternately increases in phase and decreases in phase relative to the central region to light passing through a peripheral region disposed about the central region;

the applying steps operating to result in an overall applied phase profile that alters the optical transfer function of the imaging system in such a way that the altered optical transfer function is substantially less sensitive to misfocus related aberrations than was the unaltered optical transfer function; and post processing the image captured by the detector by reversing the alteration of the optical transfer function accomplished by the wavefront modifying step.

20. The method of claim 19, wherein the step of applying a peripheral profile applies substantially linear functions.

21. The method of claim 19, wherein the step of applying a peripheral profile applies substantially cubic functions.

* * * * *

UNITED STATES PATENT AND TRADEMARK OFFICE
CERTIFICATE OF CORRECTION

PATENT NO. : 6,842,297 B2
APPLICATION NO. : 09/942392
DATED : January 11, 2005
INVENTOR(S) : Edward Raymond Dowski, Jr.

It is certified that error appears in the above-identified patent and that said Letters Patent is hereby corrected as shown below:

Column 9, line 42, "$0 < \underline{\Omega}_i\ 21\ 1$" should read --$0 < \underline{\Omega}_i < 1$--;
Column 15, line 10, "$|x| \leq 1, |y| \leq 1,$" should read -- $|x| \leq 1, |y| \leq 1,$ --;
line 37, "phase $(\rho,\theta)\ \Sigma Q(\rho/\underline{\Omega}_i)\ \alpha_i\ \rho^{\beta i} \cos(w_i\ \theta - \phi_i)$"
should read --phase $(\rho,\theta) = \Sigma Q(\rho/\underline{\Omega}_i)\ \alpha_i\ \rho^{\beta i} \cos(w_i\ \theta - \phi_i)$--;
line 43, "phase $(\rho,\theta) = \sigma Q$" should read --phase $(\rho,\theta) = \Sigma Q$--;
line 54, "phase $(\rho,\theta) = \sigma Q$" should read --phase $(\rho,\theta) = \Sigma Q$--;

Signed and Sealed this

Fourth Day of December, 2007

JON W. DUDAS
*Director of the United States Patent and Trademark Office*